United States Patent [19]

Propst et al.

[11] 4,382,648
[45] May 10, 1983

[54] ELECTRICAL ENERGY SUPPLY SYSTEM FOR WORK STATIONS IN A SPACE DIVIDER SYSTEM

[75] Inventors: Robert L. Propst, Ann Arbor; Travis M. Randolph, Saugatuck, both of Mich.

[73] Assignee: Herman Miller, Inc., Zeeland, Mich.

[21] Appl. No.: 2,608

[22] Filed: Jan. 11, 1979

Related U.S. Application Data

[63] Continuation of Ser. No. 825,655, Aug. 18, 1977, abandoned.

[51] Int. Cl.³ .......................... H02G 3/00; H02G 3/06
[52] U.S. Cl. ................................. 339/18 P; 339/22 R; 339/28
[58] Field of Search ................. 339/4, 22 R, 22 B, 23, 339/24, 28, 29 R, 18 R, 18 P; 174/48, 49; 52/220, 221, 239

[56] References Cited

U.S. PATENT DOCUMENTS

| 1,189,435 | 7/1916 | Edmands | 339/29 R |
|---|---|---|---|
| 2,162,864 | 6/1939 | Rugg et al. | 339/22 R |
| 3,190,978 | 6/1965 | Huget | 339/4 |
| 4,043,626 | 8/1977 | Propst et al. | 339/23 |
| 4,056,297 | 11/1977 | Gartung | 339/23 |
| 4,060,294 | 11/1977 | Haworth et al. | 339/4 |
| 4,135,775 | 1/1979 | Driscoll | 339/23 |

FOREIGN PATENT DOCUMENTS 12531 of 1908 United Kingdom ............. 339/49 R

*Primary Examiner*—Neil Abrams
*Attorney, Agent, or Firm*—Stephenson and Boller

[57] ABSTRACT

An electrical energy supply system for space divider systems in which a plurality of upright wall panels are arranged end-to-end so as to form at least one work station, and in which the panels are mounted on downwardly extending leg supports. The energy supply system is an under-the-wall system in which the components of the system are located below the wall panels and in the spaces occupied by the leg supports. The system consists of a plurality of connected sections, each section corresponding to a wall panel forming the work station, thereby facilitating assembly of the energy supply sections with the wall panels. Each energy supply section has the ability to deliver electrical energy to a point in the work station and each section is connectable to one or more sections corresponding to one or more wall panels in the work station or an adjacent work station to enable an efficient distribution of energy to desired points in the space divider system.

17 Claims, 13 Drawing Figures

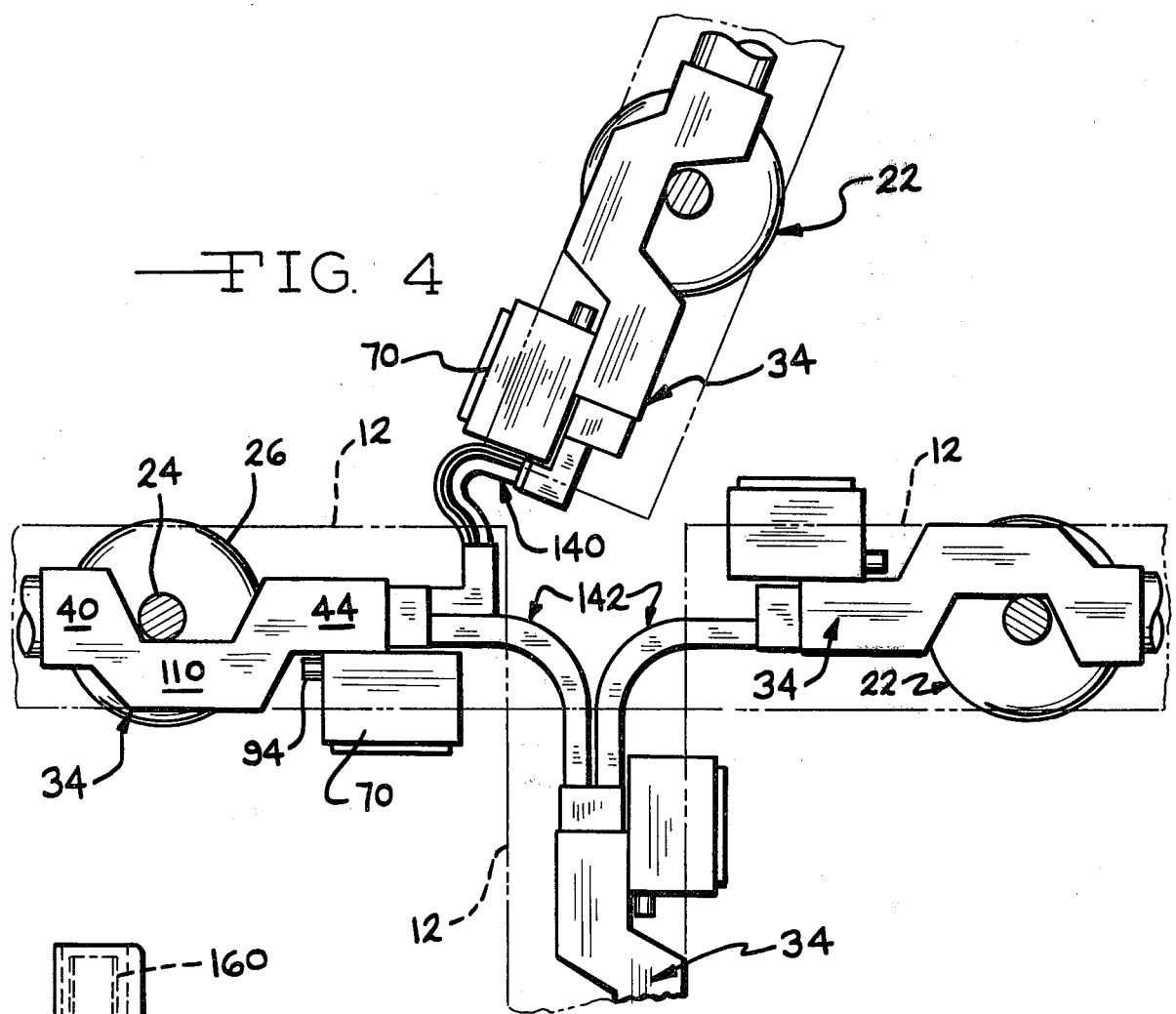
FIG. 4
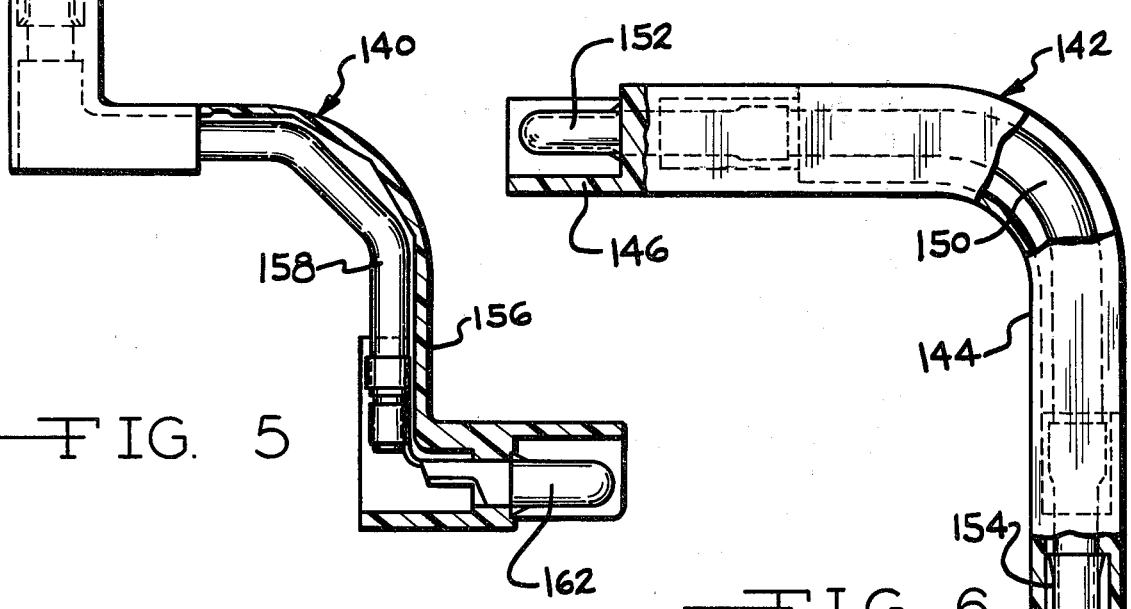
FIG. 5
FIG. 6

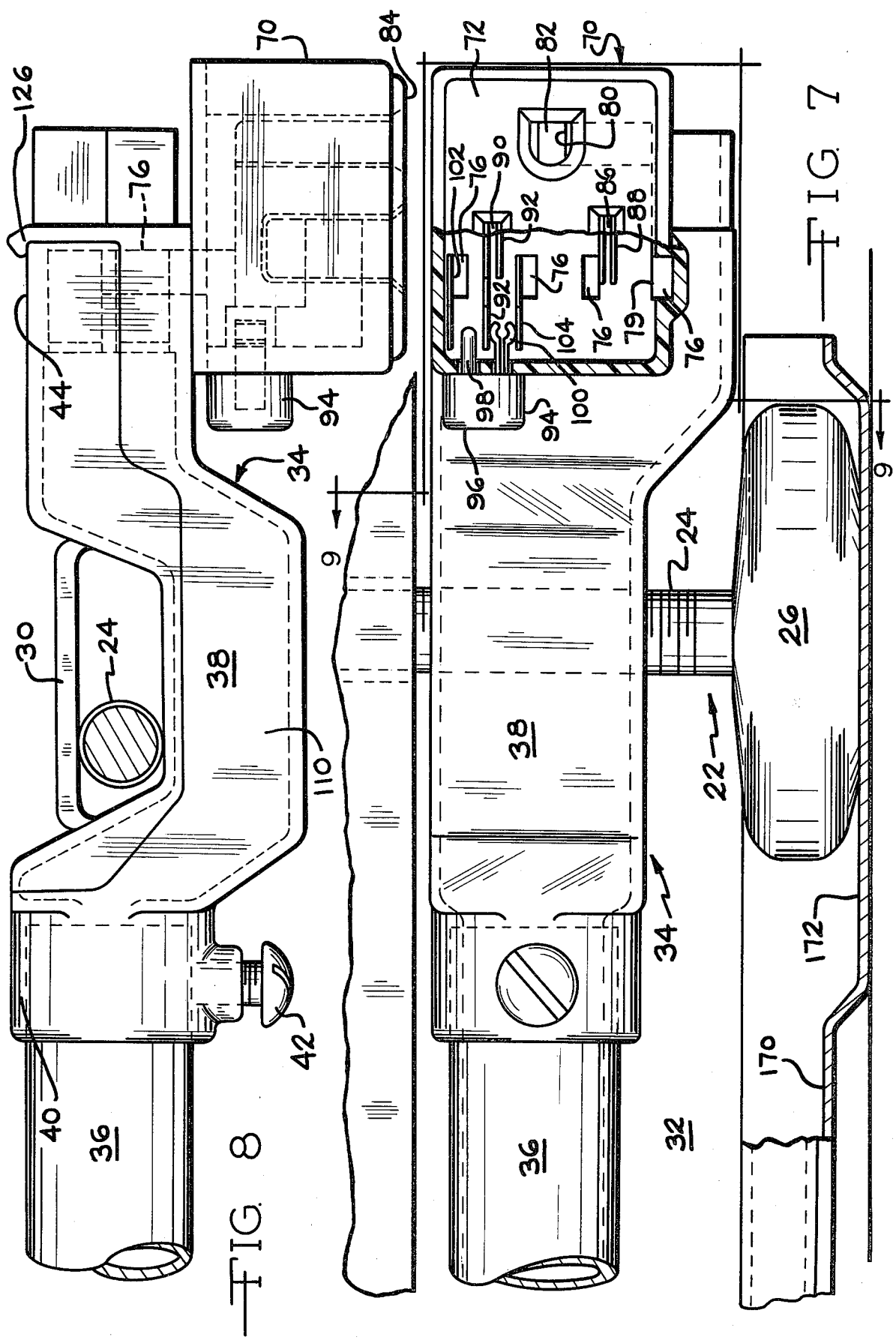

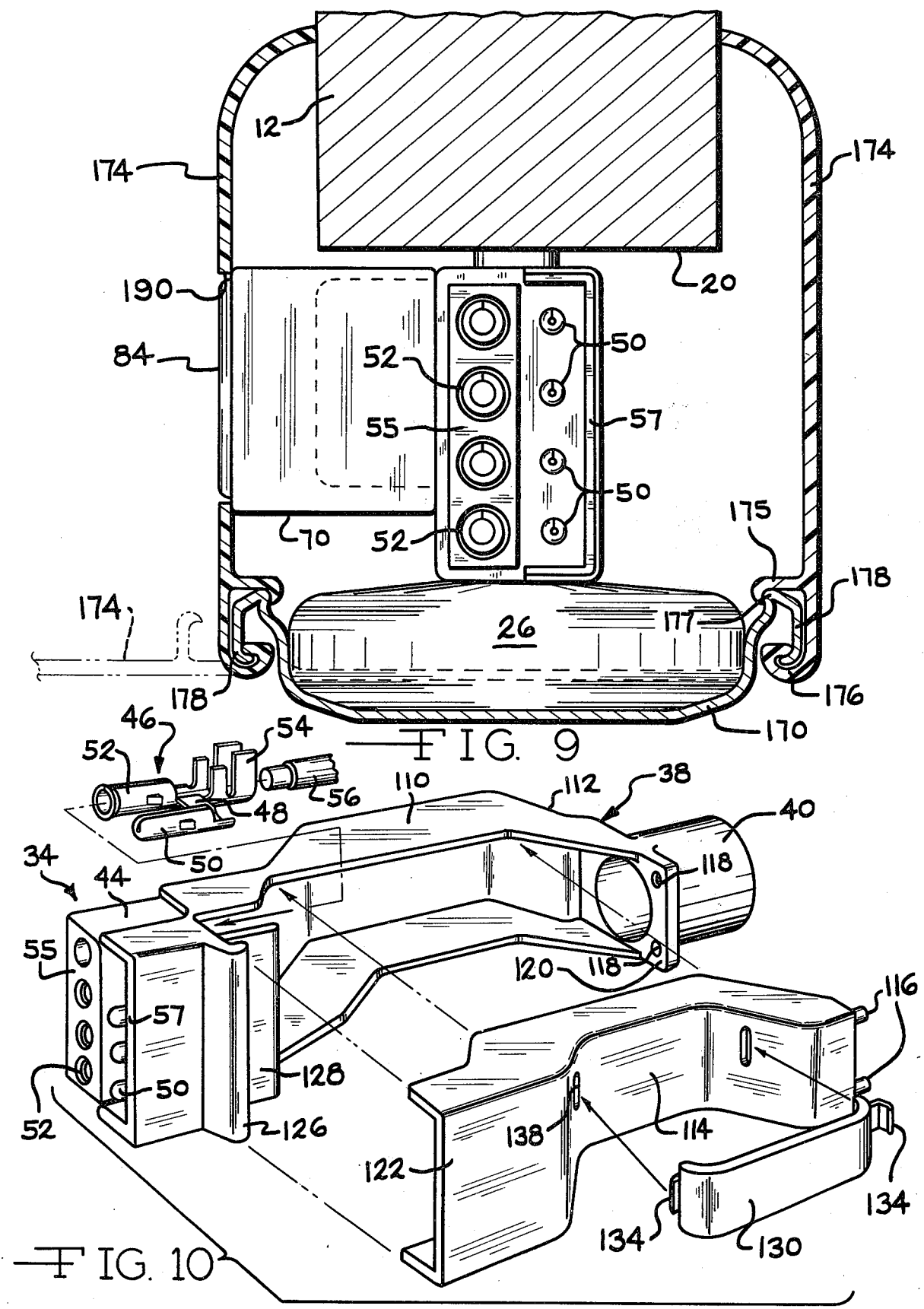

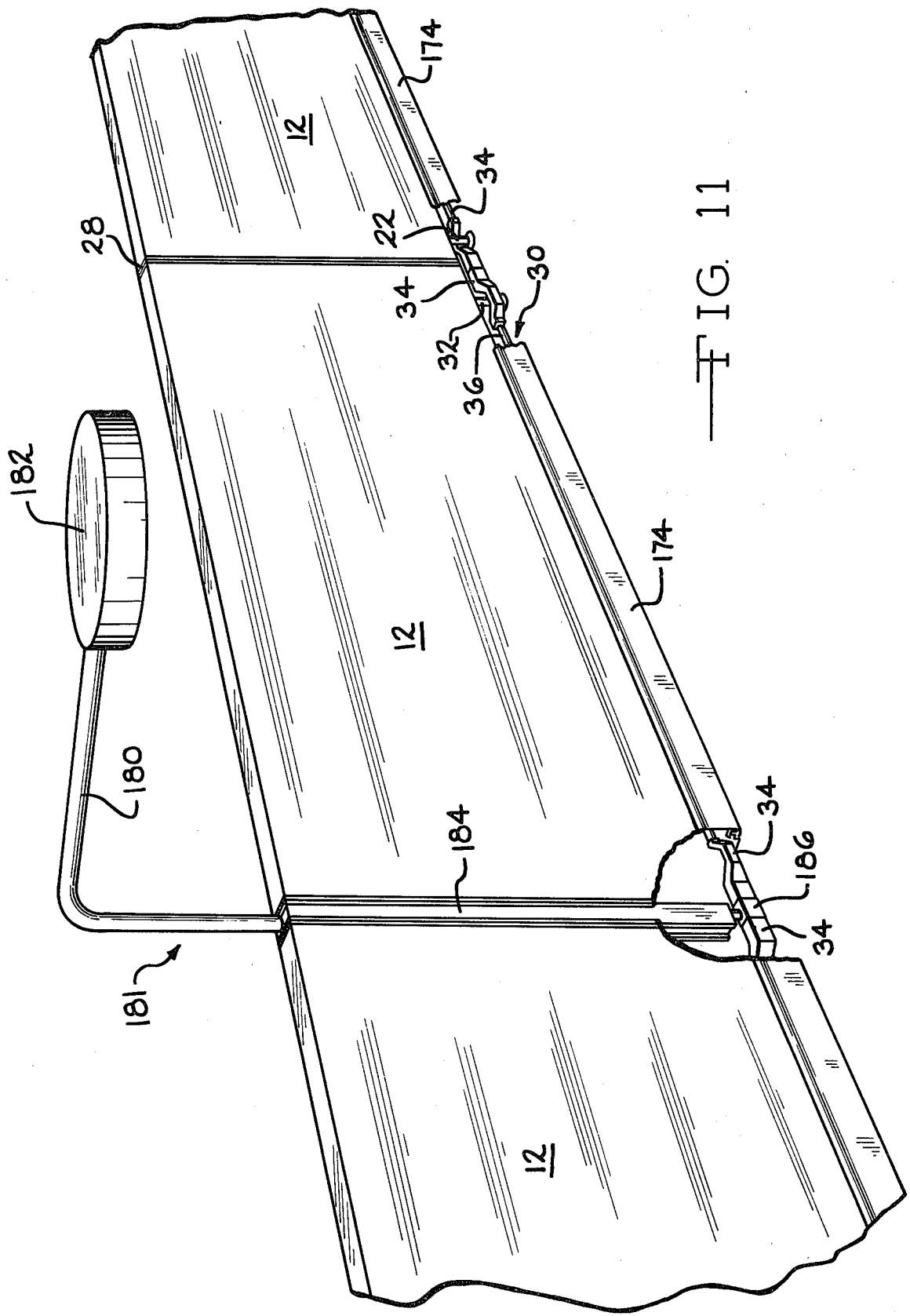

ELECTRICAL ENERGY SUPPLY SYSTEM FOR WORK STATIONS IN A SPACE DIVIDER SYSTEM

REFERENCE TO PENDING APPLICATION

This application is a continuation of pending application Ser. No. 825,655, filed Aug. 18, 1977, now abandoned.

CROSS REFERENCE TO RELATED APPLICATION

This application relates to the same general subject matter as copending application Ser. No. 699,253, filed June 24, 1976, now U.S. Pat. No. 4,043,626, and assigned to the assignee of this application.

BACKGROUND OF THE INVENTION

Space divider systems of the general type shown in U.S. Pat. Nos. 3,418,765 and 3,425,175, also assigned to assignee of this application, are coming into increasingly widespread use because of the efficiencies that are realizable in the use of these systems. For example, in the construction of a new building, the provision for these space divider systems eliminates the need for extensive permanent electrical wiring of the building. This enables the installation of non-permanent work stations, such as laboratory units, assembly areas in a manufacturing operation, office units, etc., by the manufacturer after the builder has completed construction of the building to thereby adapt areas in the building to particular desired uses which can later be revised and changed.

Work stations of the type described above all require electrical outlets for operation of electrical lighting fixtures and other electrically operated devices normally used at the work stations. Heretofore, no satisfactory systems have been available for providing these necessary sources of electrical energy. It is the principal object of this invention, therefore, to provide an electrical energy supply system that will interface with the individual wall panels at the work station so that the system can be installed irrespective of the manner in which the panels are arranged to form the work stations.

SUMMARY OF THE INVENTION

The electrical energy supply system of this invention is intended principally for use in space divider systems which employ a plurality of upright wall panels arranged end-to-end so as to form work stations and wherein the panels have upright ends and lower edges and are mounted on downwardly extending leg supports so as to form spaces below the panel lower edges. The system of this invention comprises a plurality of connected sections, each corresponding to a wall panel forming a station, and each section being disposed in the space below the wall panel lower edge. Provision is made for connecting the adjacent ends of adjacent sections irrespective of the relative angular positions of the adjacent panels so that electrical energy can be distributed from one panel section to another.

Each section of the system consists of electrical conductors housed in conduits connected at their ends to connector assemblies. Each connector assembly has provision for the mounting thereon of a receptacle outlet so that at least two outlets can be provided at each wall panel. Furthermore, circuit selector units are provided for the connector assemblies to enable the selection of one of a plurality of circuits at each receptacle outlet thereby enabling all the outlets in a space divider system to be "zoned" for the purpose of custom dividing of the environment.

The wall panels are mounted on tracks which carry movable covers that are movable to closed positions engaging the lower end portions of the wall panels so as to completely enclose the spaces below the lower edges of the panels in which the electrical energy supply system are housed. The wiring in the system of this invention is thus concealed and enclosed for both safety and appearance reasons.

It can thus be seen that the electrical energy distribution system of this invention is sectionalized to greatly facilitate its assembly with the wall panels in a space divider system. The system consists of a minimum number of identical components so that the system installer does not need to carry and catalog a large number of parts in order to quickly interface the system with a particular work station. When installed, the system provides readily accessible electrical outlets without protruding wiring, power poles, or overhead appurtenances.

Further objects, features, and advantages of the invention will become apparent from a consideration of the following description, the appended claims, and the accompanying drawing, in which:

FIG. 4 is a fragmentary plan view illustrating the connection of the connector assemblies for several adjacent wall panels in the system;

FIG. 5 is an elevational view of a flexible coupler which forms a part of the system of this invention, with some parts broken away and other parts shown in section for the purpose of clarity;

FIG. 6 is an elevational view of a rigid coupler which forms a component in the system of this invention, with some parts broken away and other parts shown in section for the purpose of clarity;

FIG. 7 is an enlarged fragmentary elevational view showing a connector assembly in the system of this invention mounted on a panel leg support and connected to a conduit and a receptacle outlet, with portions of the outlet broken away and shown in section for the purpose of clarity;

FIG. 8 is a top view of the structure shown in FIG. 7;

FIG. 9 is a transverse sectional view of the structure shown in FIG. 7, as seen from substantially the line 9—9 in FIG. 7;

FIG. 10 is an exploded perspective view of a connector assembly in the system of this invention;

FIG. 11 is a fragmentary perspective view of a space divider system provided with the energy supply system of this invention and illustrating a lighting unit interposed in the system;

Figure 1:
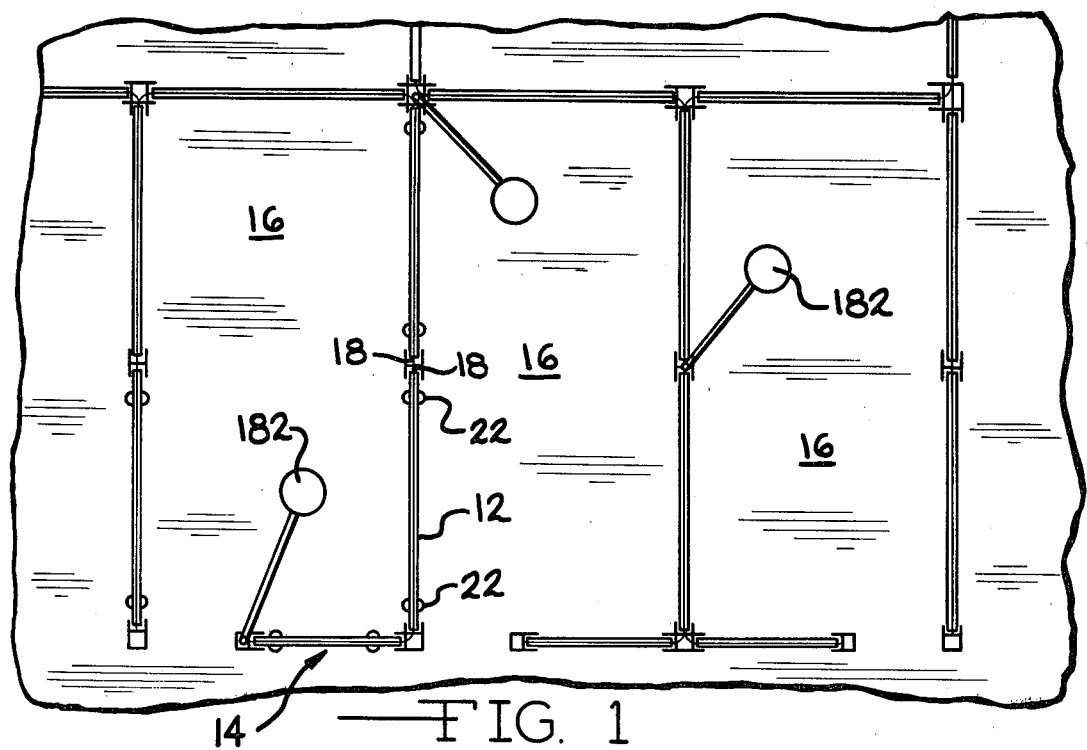
FIG. 1 is a diagrammatic plan view of a space divider system in which a plurality of upright wall panels are arranged end-to-end so as to form a plurality of work stations.
Figure 2:
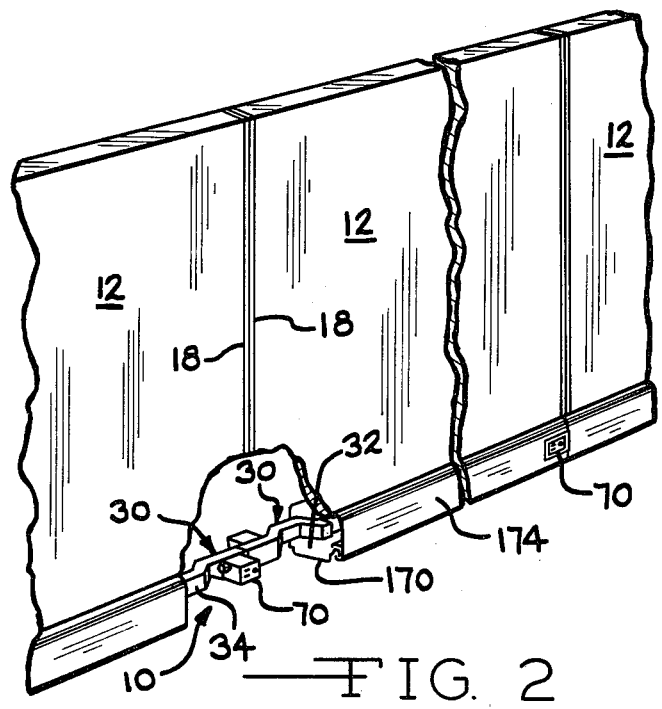
FIG. 2 is a fragmentary perspective view of a portion of a space divider system illustrated in FIG. 1 showing the energy supply system of this invention in assembly relation therewith.

With reference to the drawing, the system of this invention, indicated generally at 10, is illustrated in FIG. 2 in assembly relation with the wall panels 12 in the space divider system 14 shown in FIG. 1 in which the wall panels 12 are arranged end-to-end so as to form a plurality of work stations 16. As used herein, the term "end-to-end" is inclusive of any arrangement of two upright wall panels wherein the ends are adjacent each other, irrespective of whether or not the adjacent panels are aligned or are angularly arranged or are at any particular angle. Also, as used herein, the term "work station" is inclusive of office units, such as those illustrated at 16 in FIG. 1, laboratory units, manufacturing assembly areas, and the like.

As shown in FIGS. 2 and 9, the wall panels 12 in the system 14 have upright ends 18 and lower edges 20 with downwardly extending leg supports 22 secured to the lower edges 20. As shown in FIG. 9, each leg support 22 consists of an upright threaded spindle 24 and a floor glide 26 disposed at the lower end of the spindle 24. As shown in FIGS. 1, 7, and 11, each panel 12 is provided with a pair of leg supports 22, each of which is arranged adjacent a panel end 18. In the assembly of the wall panels 12 to form the system 14, the adjacent ends 18 of adjacent panels 12 are connected by joints 28 of suitable type such as those illustrated in U.S. Pat. No. 3,517,467, also assigned to the assignee of this application.

The system 10 is divided into a plurality of sections 30, each section being associated with one of the panels 12 and being disposed in the space 32 (FIGS. 7 and 9) underneath the panel bottom edge 20. Hence, the system 10 of this invention is sometimes referred to as an "under-the-wall" electrical energy distribution system. Each section 30 of the system 10 consists of a pair of connector assemblies 34, of unique construction hereinafter described, which are mounted on the leg supports 22 for the panel 12 and are thus located in the space 32 at the ends 18 of the panel 12 and a conventional tubular conduit 36 secured to and extending between the connector assemblies 34 and likewise disposed in the space 32.

As best appears in FIGS. 8-10, inclusive, each connector assembly 34 consists of a hollow connector body 38, preferably formed of a molded plastic material, having a tubular end portion 40 which is telescoped over the conduit 36 and is secured thereto by a set screw 42. The body 38 has a second end portion 44 which is generally rectangular in cross section and is substantially aligned with the end portion 40. A plurality of terminal units 46, illustrated as being four in number, are mounted on the connector body 38 and positioned within the end portion 44. Each unit 46 has a main contact portion 48, male and female terminals 50 and 52, respectively, and a clamp portion 54. The terminal units 46 are spaced apart vertically in the end portion 44 of the body 38 so that the male portions 50 are vertically aligned and the female portions 52 are similarly vertically aligned. Significantly, the male and female portions 50 and 52 are arranged so that they are symmetrical with respect to a horizontal plane thereby enabling the interfitting of the male portions 50 on one body 38 with the female portions 52 on another body 38, and vice versa, when the bodies 38 are relatively inverted as illustrated for the two bodies 38 shown in FIGS. 12 and 13. The housing end portion 44 (FIG. 10) is formed so that the female terminals 52 are fixed in a block 55 and a three-sided flange 57 extends about the male terminals 50 and is of a size to telescope over the block 55. As a result, when two bodies 38 are relatively inverted, the end portions 44 will relatively telescope so as to guide the male and female terminals into interfitting firm contact making positions.

Each section 30 includes a plurality of electrical conductors, there being four conductors 56, 58, 60, and 62 in the illustrated form of the system 10. Each of the conductors is clamped to a portion 54 of a terminal unit 46, the conductors 56 and 62 being clamped to the top and bottom units 46 and the conductors 58 and 60 being clamped to the intermediate units 46. The conductors 56 and 58 are of the same polarity, for example, positive, and the conductor 60 is of the opposite polarity, for example, negative, and conductor 62 is connected to ground.

Associated with each connector assembly 34, is a receptacle outlet 70 which consists of a generally rectangular housing 72, preferably formed of a molded plastic, and provided on its rear face 74 with four rearwardly extending prong contacts 76 which can be moved through socket openings 78 in the connector body 38 into engagement with the contact portions 48 of the terminal units 46 which function as socket contacts. Thus, the prong contacts 76 engage the four terminal units 46 corresponding to the conductors 56, 58, 60, and 62. Inside the receptacle housing 72, the prong contact 76 for the ground conductor 62 is connected by a lead 79 with a socket contact 80 aligned with a slot 82 in the front wall 84 of the housing 72. A slot 86 in the front wall 84 is aligned with conductors 88 which are connected to the prong contact 76 that is connected to the negative polarity conductor 60. A slot 90 in the front 84 is aligned with conductors 92 which are positioned between the prong contacts 76 that are engaged with the terminals 46 for the conductors 56 and 58 of positive polarity.

The use of the two conductors 56 and 58 of the same polarity enables the system 10 to offer two circuits at each wall panel 12 and a selector member 94 is associated with each receptacle outlet 70 for selecting which of the two electrical circuits will be available at the outlet 70. The selector member 94 consists of a body 96 formed on one side with a pair of generally parallel projections, namely, a projection 98 formed of an electrically non-conducting material such as plastic and a projection 100 formed a conducting material such as copper. The projection 100 is shaped to bridge the gap between the conductor 92 and either one of the conductors 102 and 104 secured to the prong contacts 76 corresponding to the conductors 56 and 58. In the illustrated position of the selector member 94 shown in FIG. 7, the conductor 100 connects the contacts 92 and 104 so that the circuit utilizing the positive polarity conductor 58 is available at the receptacle outlet 70.

Figure 12:
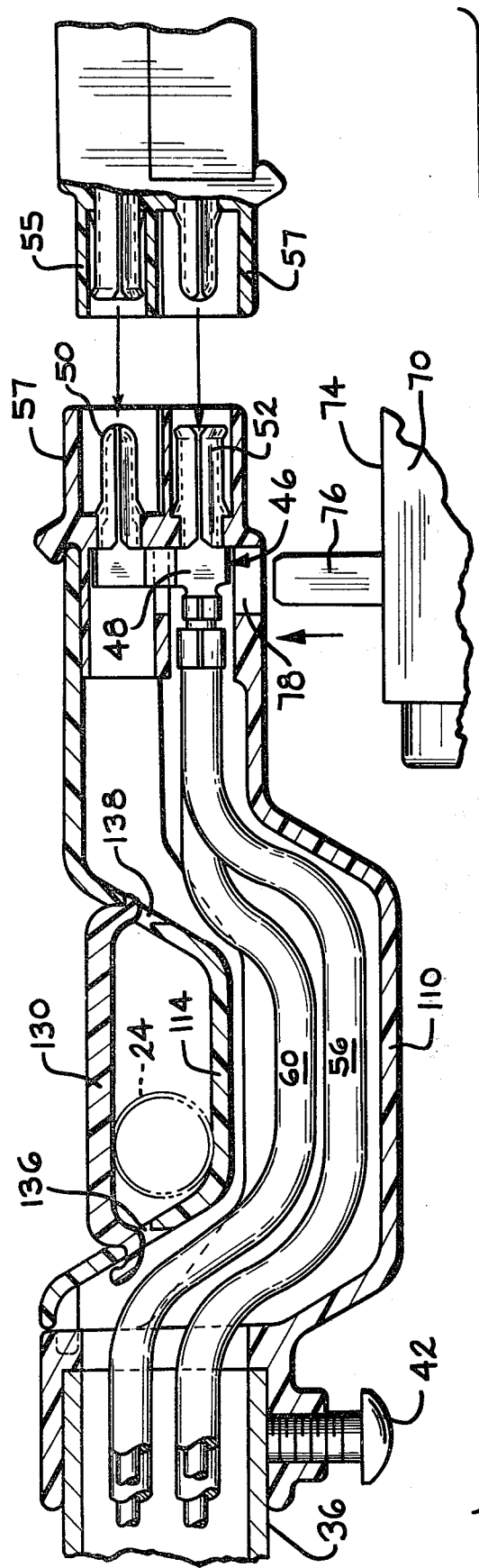
FIG. 12 is a horizontal sectional view of a connector assembly in the system of this invention illustrating a receptacle outlet being assembled therewith.

As shown in FIGS. 4, 10, and 12, the end portions 40 and 44 of the connector body 38 are aligned in a direction lengthwise of the supporting panel 12 and a center portion 110 is offset relative to the portions 40 and 44 and is positioned against one side of the leg support spindle 24. As shown in FIG. 4, the leg supports 22 are substantially centered with respect to the panel 12 as are the end portions 40 and 44 of the body 38, while the center portion 110 is positioned to one side of center and against one side of the spindle 24. The body 38 consists of a main section 112 and a side section 114 provided at one end with integral pins 116 which fit in openings 118 formed on an end flange 120 on the body main section 112.

In the assembly of the side section 114 with the main section 112, the pins 116 are first positioned in the openings 118 and then the end 122 of the side section 114 is snapped over a yieldable projection 126 on the main section 112 to an assembly position against a flange 128 on the main section 112. The side section 114 is then positioned in frictional engagement with one side of the threaded spindle 24 and maintained in such engagement by a clamp member 130 having snap tabs 134 at its ends which snap into openings 136 and 138, respectively, in the side section 112, as shown in FIG. 12. The clamp member 130, when mounted on the body 38, exerts pressure on one side of the spindle 24 so as to pull the body side section 114 into firm frictional engagement with the opposite side of the spindle 24 so as to maintain the connector body 38 in a mounted position on the spindle 24 in the space 32.

Figure 3:
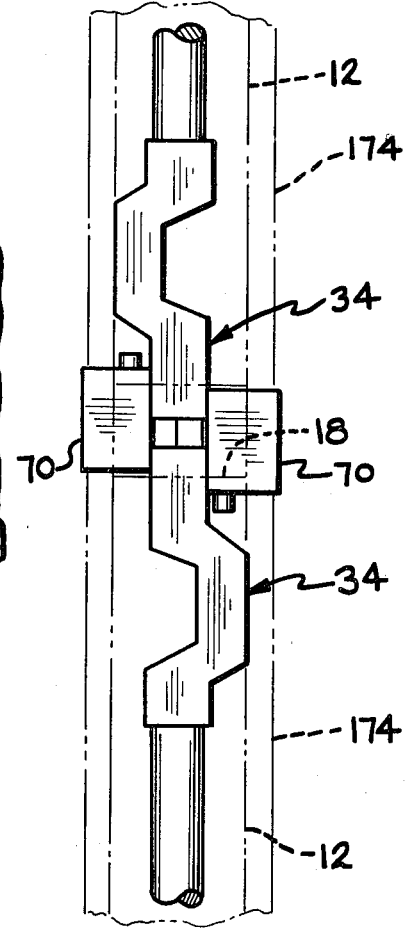
FIG. 3 is a fragmentary enlarged view of a portion of the electrical energy supply system of this invention at the juncture of a pair of aligned wall panels.
Figure 13:
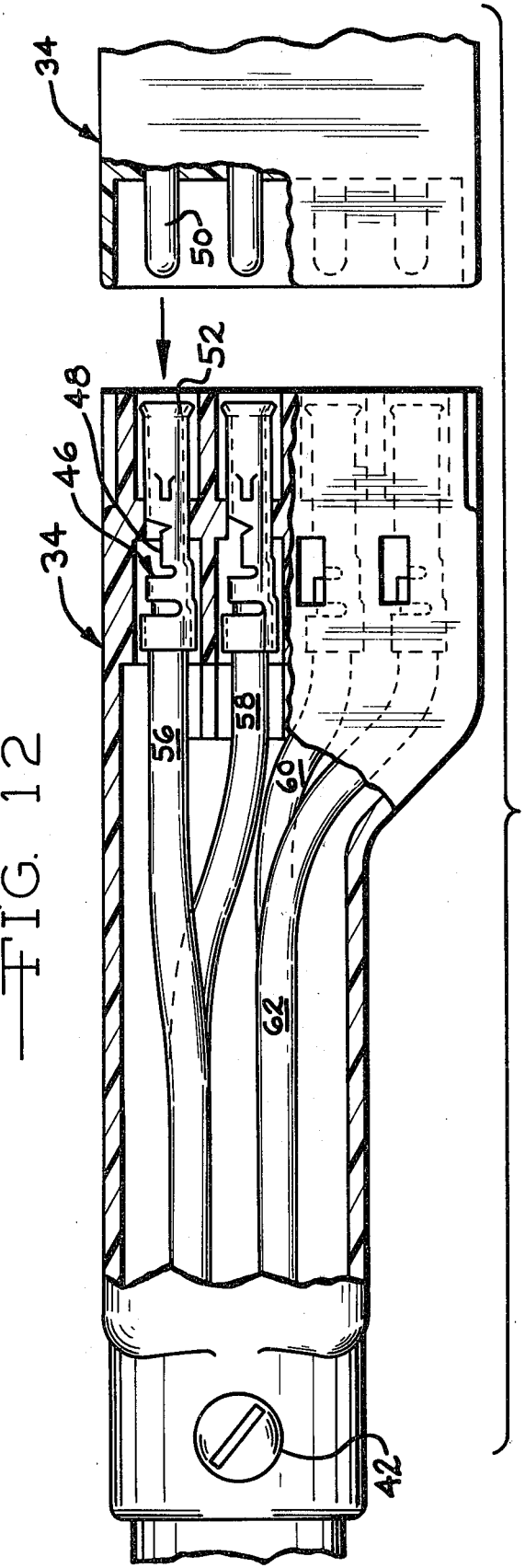
FIG. 13 is a vertical sectional view of a connector assembly in the system of this invention, illustrating the assembly being interfitted with another identical assembly.

A flexible coupler unit 140 (FIG. 5) and a rigid coupler unit 142 (FIG. 6) are provided for electrically connecting the connector assemblies 34 at adjacent ends of adjacent wall panels 12 when the adjacent connector assemblies cannot be relatively telescoped as illustrated in FIGS. 3, 12, and 13. Examples of situations in which the connector assemblies 34 cannot be relatively telescoped are shown in FIG. 4 in which aligned panels 12 are spaced from each other or the adjacent panels are arranged at an angle relative to each other. In a situation in which two adjacent end-to-end panels are to be disposed at right angles relative to each other, which is a common occurence in the forming of work stations 16 with the panels 12, the rigid coupler unit 142 shown in FIG. 6 is used.

The unit 142 consists of a rigid body 144 having end portions 146 and 148 which are arranged ar right angles relative to each other. Four vertically spaced conductors 150 are housed in the body 144 and correspond to the conductors 56, 58, 60, and 62 in the system sections 30. The conductors 150 are connected at the end portion 146 to male terminals 152 and at the end portion 148 to female terminals 154. The terminals 152 correspond in number and arrangement to the female portions 52 of the terminals 46 and, similarly, the female terminals 154 correspond in number and arrangement to the number and arrangement of the male portions 50 of the terminals 46. As a result, the rigid coupler 142 can be used to connect the terminal units 46 for one connector assembly 38 with another connector assembly 34 arranged at right angles to the first connector assembly as illustrated in FIG. 4.

The flexible coupling 140 consists of a bendable or yieldable body 156 which supports a plurality of conductors 158 corresponding in number to the number of conductors in a section 30, with each conductor 158 being flexible in the same sense that the body 156 is flexible. At their ends, the conductors 158 are connected to female terminals 160 and to male terminals 162 which are operable like the terminals 152 and 154 in the coupler unit 142 so as to connect the terminal units 46 at adjacent ends of adjacent panels 12 when the panels 12 are arranged at an angle other than ninety degrees. The body 156 and the conductors 158 can be flexed and bent to accommodate the coupler 140 to the position necessary to electrically interconnect the sections 30 corresponding to the angularly arranged wall panels 12 shown in FIG. 4 as having the bent coupler 140 extending therebetween.

In the use of the system 10 to provide electrical energy for the work stations 16, the panel leg supports 22 are positioned in track members 170 having cups 172 shaped to receive the glides 26 on the leg supports 22 and being substantially coextensive in length with the panels 12. A pair of cover members 174 (FIGS. 2 and 9), each having a return bent-upon-itself end portion 176, are pivotally mounted at their end portions 176 on flanges 178 formed on opposite sides of the track 170. The cover members 174, when so mounted, are pivotally movable up and down about the flanges 178 between the upwardly extending positions shown in solid lines in FIG. 9 in which the covers 174 enclose the space 32 and conceal the elements of the system 10 therein, and downwardly moved positions, such as the one indicated in broken lines in FIG. 9, in which the cover members 174 provide access to space 32. Coacting flanges 175 and 177 on the covers 174 and the track 170 engage to latch the covers 174 in their upwardly extending positions.

Each panel 12 has its own section 30 of the system 10 and, as shown in FIG. 11, the connector assemblies 34 at the ends of each section 30 have their offset portions 110 on the same side of the leg supports 22. This facilitates assembly of the sections 30 with the panels 12 because they can readily be moved sideways into the spaces 32. Aligned end-to-end panels 12 have the sections 30 therein electrically connected by relatively telescoping the adjacent connector assemblies 34 in the manner illustrated in FIGS. 3 and 12. As shown in FIG. 3, this arrangement permits the provision of receptacle outlets 70 on opposite sides of the wall panels 12 since the connector assemblies 34 for these panels are in relatively inverted positions. As shown in FIG. 9, the cover member 174 is provided with an opening 190 through which the receptacle outlet 70 can extend so that the outer wall 84 of the outlet 70 is substantially flush with the outer surface of the cover member 174.

The coupler units 140 and 142 are used to electrically interconnect adjacent panels 12 which are not aligned, as illustrated in FIG. 4. The result is a very versatile system 10 which can be used to wire a work station 16 so that the station is provided with the desired wiring for the light fixtures 182 and the desired receptacle outlets 70 at the base of each of the wall panels 12. Since the connector assemblies 34 are identical, the receptacle outlets 70 are identical, and only two different couplers 140 and 142 are required, the installer of the system 30 can work with a minimum number of parts thereby simplifying installation and reducing costs. The system 10 is readily accessible for repair or revision by merely moving the cover members 174 which in their normal positions conceal and enclose the system 10 for purposes of both safety and appearance.

Lighting fixture units 181 (FIG. 11) that will interface with the panels 12 and the system 10 are also provided. Each unit includes a hollow mounting arm 180 supporting a lighting fixture 182 and carried on a wall body 184. Each body 184 is shaped to fit between the adjacent ends of adjacent panels 12 and be connected thereto by the joints 28. Conductors (not shown) in the conduit 180 and the body 184 are connected to a connector 186 at the lower end of the body 184 that has male and female portions like the portions 50 and 52 previously described which interfit with the corresponding portions on the connector assemblies 34 to thereby electrically connect the fixture 182 in the system 10.

What is claimed is:

1. In a space divider system which includes a plurality of upright wall panels arranged end-to-end so as to form at least one work station and wherein said panels have upright ends and lower edges and are mounted on downwardly extending leg supports located adjacent said panel ends so as to form a space below each of the panel lower edges, an electrical energy supply system for said work station comprising a plurality of connected sections each corresponding to a wall panel forming said station, each section comprising a pair of connector assemblies located in said space and each comprising a connector body and a plurality of terminal units in said body, said body being mounted on one of said leg supports so as to extend substantially to the adjacent end of the corresponding panel, electrical conductors disposed in said space and extending between and connecting the terminal units in the connector bodies at each end of the panel, the terminal units on one panel being constructed to interfit with the terminal units on another panel in said station to enable the transfer of electrical energy from the energy supply section for one panel to the energy supply section for another panel, and at least one receptacle outlet interfitted with the terminal units in one of said connector assemblies and mounted on the connector body in said one assembly.

2. The energy supply system set forth in claim 1 further including tracks corresponding in length to substantially the lengths of said wall panels and arranged in a supporting relation with said leg supports, and cover members movably mounted on opposite sides of said tracks and movable to upwardly extending positions engaging said panels to enclose said space.

3. The energy supply system set forth in claim 2 wherein said receptacle outlet extends generally horizontally away from the connector body on which it is mounted, said receptacle outlet projecting through the cover member for the corresponding wall panel and having the outer face thereof substantially flush with the outer surface of said cover member.

4. The energy supply system set forth in claim 1 wherein said receptacle outlet comprises a body member having a face provided with socket contacts, interfitting prong contacts and socket contacts on said body member and said connector body connecting the terminal units in the connector body with the socket contacts on the receptacle body member.

5. The energy supply system set forth in claim 4 wherein said electrical conductors are at least three in number, two of said conductors being of one polarity and the remaining one of said conductors being of the opposite polarity, the terminal units connected to said two conductors of the same polarity being positioned adjacent each other and the terminal unit for the third conductor being spaced from the other two, a circuit selector member mountable on said receptacle body member in a pair of relatively inverted positions, said selector member in one of said positions, connecting one of the socket contacts on said body member with the terminal unit for one of the two conductors that are of the same polarity, and in the other position connecting the terminal unit for the other one of said two conductors that are of the same polarity with said one socket contact thereby making two electric circuits available at said receptacle outlet with the selector member being operable to enable selection of one or the other of said circuits.

6. The energy supply system according to claim 1 wherein said connector assemblies are identical, each of said connector bodies having a pair of ends, means at one of said ends adapting said body for connection to a conduit for housing said electrical conductors, said terminal units being mounted on the opposite end of said body and having male and female portions arranged so that they are symmetrical with respect to a horizontal plane so that when a pair of said bodies are relatively inverted, the male portions on one body will telescope into the female portions on the other body to provide for the electrical connection of the terminals in said bodies.

7. The energy supply system set forth in claim 6 wherein at least a pair of said receptacle outlets are provided for a pair of connected connector assemblies, said pair of receptacle outlets extending horizontally in opposite directions to provide electric socket outlets on both sides of the panels on which said connector assemblies are mounted.

8. The energy supply system set forth in claim 1 further including a coupler unit comprising a body, electrical conductors housed in said body, and terminal units mounted on opposite ends of said body and connected to opposite ends of said conductors, said terminal units having male and female portions constructed to interfit with the male and female portions of the terminal units on said connector bodies, the male and female portions at each end of said coupler body being disposed in a non-aligned relation with the male and female portions at the other end of said body to thereby enable adjacent end-to-end panels to be angularly arranged relative to each other by interposing a coupler unit between the connector assemblies at adjacent ends of adjacent panels.

9. The energy supply system set forth in claim 8 wherein said coupler body is formed of a generally rigid material configured so that the male and female portions at one end of said body are substantially perpendicular to the male and female portions at the opposite end of said body thereby enabling the arrangement of adjacent wall panels at relatively perpendicular locations.

10. The energy supply system set forth in claim 8 wherein said coupler body is formed of a flexible material.

11. The energy supply system set forth in claim 1 wherein said panels are of predetermined widths, having pairs of vertically disposed opposite faces and wherein said leg supports are substantially centered between the faces on each panel, and wherein each of said connector bodies is shaped so that it has a pair of end portions which are substantially centered between the panel faces and a center portion which is offset horizontally with respect to said end portions and frictionally engaged with one side of a leg support.

12. The energy supply system set forth in claim 11 wherein said leg supports have vertically extending external threads and said connector bodies have grooved sections frictionally engaged with the threads on one of the sides of said leg supports.

13. The energy supply system set forth in claim 12 wherein said grooved sections on said connector bodies are formed on the center portions thereof, and further including retainer straps connected to and extended between the end portions of said connector bodies and engaged with the sides of said leg supports opposite the sides of the leg supports engaged with said center portions so as to maintain said center portions in frictional engagement with said leg supports.

14. The energy supply system set forth in claim 11 further including clamp means mounted on each of said connector bodies and frictionally engaged with the opposite sides of the leg supports engaged by said connector bodies.

15. The energy supply system set forth in claim 11 wherein the connector bodies in each section of said supply system have the center portions thereof offset horizontally in the same direction so that a section can be moved into position below a wall panel by moving the section horizontally in one direction at a position below the panel.

16. An under-the-wall system for distributing electrical energy in a work station which includes at least a pair of wall panels arranged end-to-end and each having a lower edge and support means extending downwardly from said lower edge, conduit means disposed beneath said lower edges and having electrical conductors therein, connector assemblies disposed beneath said edges and adjacent the juncture of adjacent wall panels, said connector assemblies being identical and each comprising a hollow body secured at one end to said conduit means and having said conductors housed therein, a terminal unit mounted on the opposite end of each said body and connected to said conductors therein, said terminal units being interfittable with like terminal units on the connector body for the adjacent wall panel, means mounting said connected conduit means and connector assemblies for each wall panel on the panel at a position below the lower edge thereof, each of said connector bodies having a pair of ends, means at one of said ends adapting said body for connection to a conduit for housing said electrical conductors, said terminal units being mounted on the opposite end and said body and having male and female portions arranged so that they are symmetrical with respect to a horizontal plane so that when a pair of said bodies are relatively inverted, the male portions on one body will telescope into the female portions on the other body to provide for the electrical connection of the terminals in said bodies.

17. The energy supply system set forth in claim 16 further including a receptacle outlet mounted on at least one of said connector bodies, said receptacle outlet comprising a body member having a face provided with socket contacts, interfitting prong contacts and socket contacts on said body member and said connector body connecting the terminal units in the connector body with the socket contacts on the receptacle body member.

* * * * *